United States Patent
Baker et al.

(10) Patent No.: US 11,195,097 B2
(45) Date of Patent: Dec. 7, 2021

(54) BUILDING ENSEMBLES FOR DEEP LEARNING BY PARALLEL DATA SPLITTING

(71) Applicant: D5AI LLC, Maitland, FL (US)

(72) Inventors: James K. Baker, Maitland, FL (US); Bradley J. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/609,130

(22) PCT Filed: Jul. 2, 2019

(86) PCT No.: PCT/US2019/040333
§ 371 (c)(1),
(2) Date: Oct. 28, 2019

(87) PCT Pub. No.: WO2020/018279
PCT Pub. Date: Jan. 23, 2020

(65) Prior Publication Data
US 2021/0248474 A1 Aug. 12, 2021

Related U.S. Application Data

(60) Provisional application No. 62/698,593, filed on Jul. 16, 2018.

(51) Int. Cl.
*G06N 3/08* (2006.01)
*G06N 3/04* (2006.01)
(52) U.S. Cl.
CPC .......... *G06N 3/084* (2013.01); *G06N 3/0454* (2013.01)

(58) Field of Classification Search
CPC ............................ G06N 3/084; G06N 3/0454
See application file for complete search history.

(56) References Cited

U.S. PATENT DOCUMENTS 6,704,717 B1 3/2004 Tate
9,508,347 B2 * 11/2016 Wang .................... G10L 15/063
(Continued)

FOREIGN PATENT DOCUMENTS

WO WO 2016/037350 A1 3/2016
WO WO 2018/175098 A1 9/2018
(Continued)

OTHER PUBLICATIONS

Dai et al. "A two-phased and Ensemble scheme integrated Backpropagation algorithm." Applied Soft Computing 24 (Year: 2014).*
(Continued)

Primary Examiner — Michael J Huntley
Assistant Examiner — Adam C Standke
(74) Attorney, Agent, or Firm — K&L Gates LLP

(57) ABSTRACT

Computer-implemented systems and methods build ensembles for deep learning through parallel data splitting by creating and training an ensemble of up to 2n ensemble members based on a single base network and a selection of n network elements. The ensemble members are created by the "blasting" process, in which training data are selected for each of the up to $2^n$ ensemble members such that each of the ensemble members trains with updates in a different direction from each of the other ensemble members. The ensemble members may also be trained with joint optimization.

32 Claims, 5 Drawing Sheets

(56) References Cited

U.S. PATENT DOCUMENTS

2016/0350649 A1* 12/2016 Zhang ............... G06N 3/0454
2019/0095798 A1    3/2019 Baker

FOREIGN PATENT DOCUMENTS

| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Chan et al. "Fast neural network ensemble learning via negative-correlation data correction." IEEE transactions on neural networks 16.6 (Year: 2005).*

Alon et al. "The maximum number of disjoint pairs in a family of subsets." Graphs and Combinatorics 1.1 (Year: 1985).*

Li et al. "A novel dynamic weight neural network ensemble model." International Journal of Distributed Sensor Networks 11.8 (Year: 2015).*

Riedmiller et al. "A direct adaptive method for faster backpropagation learning: The RPROP algorithm." IEEE international conference on neural networks. IEEE (Year: 1993).*

Kong et al. "Error-correcting output coding corrects bias and variance." Machine learning proceedings (Year: 1995).*

International Search Report and Written Opinion of the International Searching Authority for International Application No. PCT/US2019/040333 dated Oct. 4, 2019.

* cited by examiner

BUILDING ENSEMBLES FOR DEEP LEARNING BY PARALLEL DATA SPLITTING

PRIORITY CLAIM

The present application is a National Stage application of International Application Serial No. PCT/US2019/040333, filed Jul. 2, 2019, which claims priority to United States provisional patent application Ser. No. 62/698,593, filed Jul. 16, 2018, each having the same title and inventors as indicated above, and each of which is incorporated herein by reference.

BACKGROUND

In recent years, artificial intelligence based on machine learning with deep neural networks has had great success. In recent benchmark competitions on difficult machine learning tasks, the most successful machine learning systems have been ensembles of a plurality of individual machine learning systems. There are many well-known methods for building ensembles of machine learning systems. Furthermore, in many cases the performance of an ensemble of machine learning systems consistently tends to increase as the number of member systems in the ensemble is increased.

The success of an ensemble depends on the diversity among the ensemble members. In many cases, after some number of ensemble members have been created, each new ensemble member is more redundant with the existing ensemble members and adds less incremental diversity. As a consequence, the number of ensemble members for an efficient ensemble may be limited, which in turn limits the gain in performance that can be achieved by the ensemble.

SUMMARY

In one general aspect, the present invention creates and trains an ensemble of up to $2^n$ ensemble members based on a single base network and a selection of n network elements. The ensemble members are created by a process, herein called "blasting," in which training data is selected for each of the up to $2^n$ ensemble members such that each of the ensemble members trains with updates in a different direction from each of the other ensemble members. The ensemble members may also be trained with joint optimization.

BRIEF DESCRIPTION OF DIAGRAMS

Various embodiments of the present invention are described herein by way of example in connection with the following figures.

DETAILED DESCRIPTION

Figure 1:
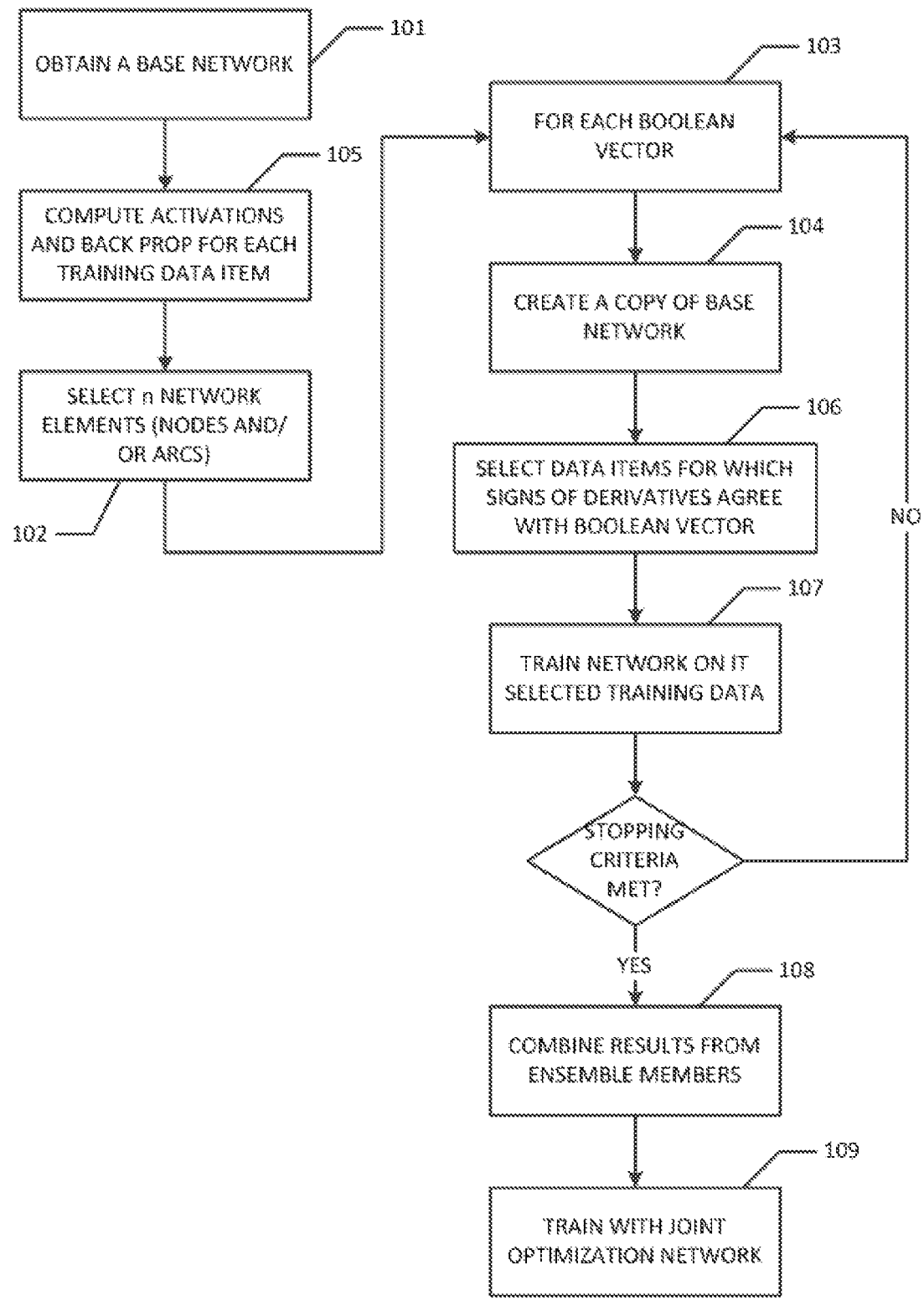
FIGS. 1 and 1A are flowcharts of illustrative embodiments of the invention disclosed herein.
Figure 1A:
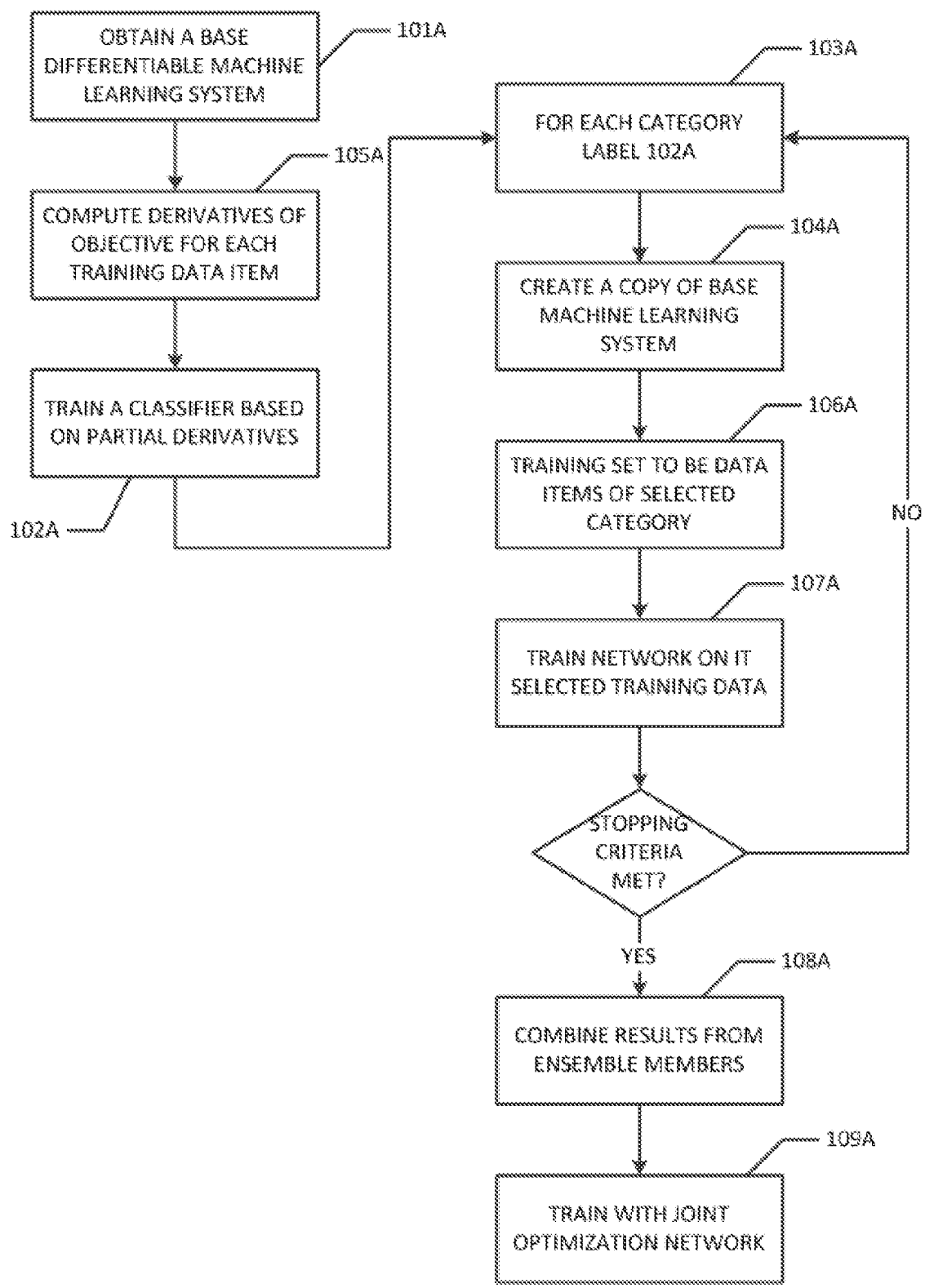
Figure 1B:
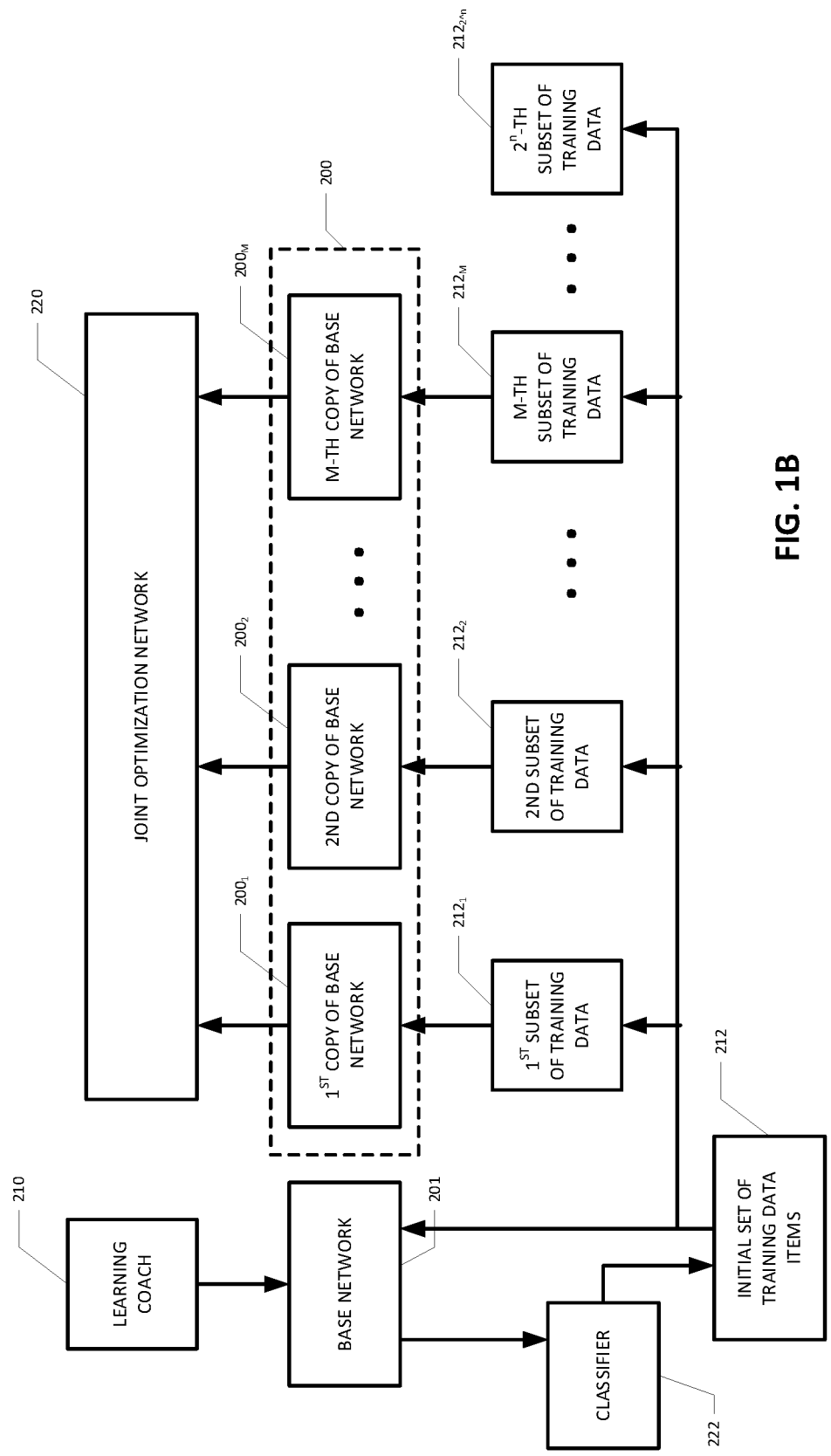
FIG. 1B is a diagram of an ensemble of machine-learning networks according to various embodiments of the present invention.

FIG. 1 is a flowchart of an illustrative embodiment of the present invention for expanding a single neural network into an ensemble, such as the ensemble 200 shown in FIG. 1B, in which each member $200_{1-M}$ receives training that causes its learned parameters to be changed in a direction that is different for each other ensemble member. The process shown in FIG. 1 is designed to build and train ensembles of neural networks. The computations represented in FIG. 1 may be performed by a computer system such as the system illustrated in FIG. 3.

Figure 2:
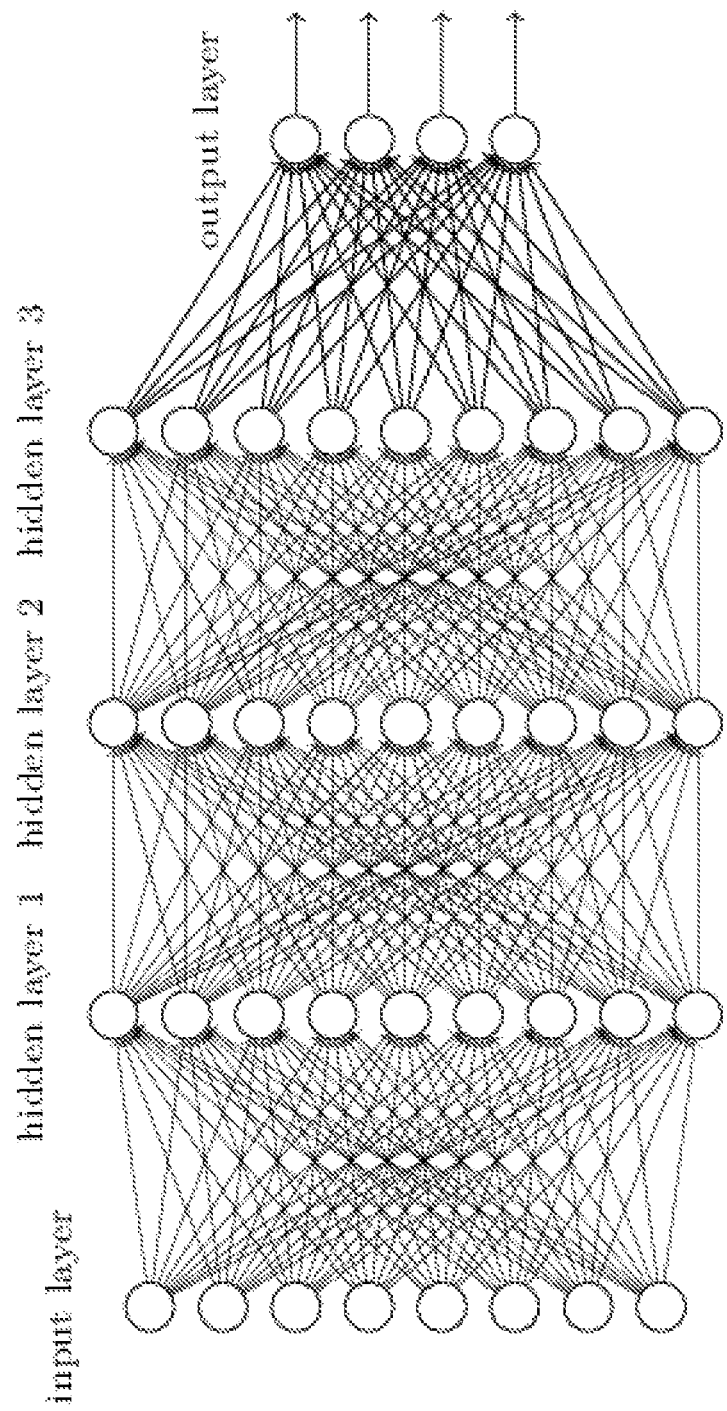
FIG. 2 is an illustrative diagram of a feed forward neural network which may be an element in various aspects of the invention.

An example of a neural network is shown in FIG. 2. A neural network (also called an "artificial neural network") may be represented by a directed graph, which may be organized into layers. A neural network graph comprises an input layer, an output layer, zero or more inner layers (also called "hidden" layers), and weighted directed arcs. Each directed arc connects a first node, called its source node, to a second node, called its destination node. The weight of a directed arc represents the strength of the connection from its source node to its destination node. The example neural network shown in FIG. 2 has an input layer, an output layer, and three hidden layers and is a fully connected network. That is, each node except the output nodes is connected to each of the nodes in the next layer above. A neural network with two or more hidden layers is called a "deep neural network." Although FIG. 2 shows a fully-connected network, it should be recognized that the present invention is not limited to fully-connected networks and, instead, is applicable to other types of deep learning networks.

The weight associated with a directed arc in a neural network is called a "learned" parameter (also called a "trainable" parameter). A node in a neural network may also be associated with an additional learned parameter, which is called the "bias" of the node. In the process of training a neural network (also called the "learning" process), the values of the learned parameters are iteratively updated to find values that attempt to optimize a specified objective. The objective may be represented by specified target values for some or all the output nodes for each item of training data. Numerically, the objective may be represented by an error or "cost" function that is based on the difference between the specified target values and the actual values for the output nodes for an item of training data. Other parameters, called "hyperparameters," may be used to initialize the learned parameters or to help control the learning process. Hyperparameters are not learned or trainable parameters. Hyperparameter values may be set by the system designer or, in other embodiments, may be controlled by a second machine learning system, called a "learning coach" 210 shown in FIG. 1B.

A learning coach is a separate machine learning system that learns to control and guide the learning of a primary learning system. For example, the learning coach 210 itself uses machine learning to help a "student" machine learning system, e.g., the base network 201 shown in FIG. 1B of which the copies are made according to the methods of FIGS. 1 and 1A. For example, by monitoring the student machine learning system 201, the learning coach 210 can learn (through machine learning techniques) "hyperparameters" for the student machine learning system 201 that control the machine learning process for the student learning system 201. For example, in the case where the student machine learning system 201 uses a deep neural network (DNN), the learned hyperparameters can include the mini-batch size M, the learning rate the regularization parameter $\lambda$, and/or the momentum parameter $\mu$. Also, one set of learned hyperparameters could be used to determine all of the weights of the student machine learning system's network, or customized learned hypermeters can be used for different weights in the network. For example, each weight (or other trainable parameter) of the student learning system could have its own set of customized learned hyperparameters that are learned by the learning system coach.

Additionally or in lieu of learning the hyperparameters or the other enhancements/updates described above, the learning coach 210 could determine structural modifications for the student learning system architecture 201. For example, where the student learning system uses a DNN, the machine learning coach 210 can modify the structure of the DNN, such as by adding or deleting layers and/or by adding or deleting nodes in layers. Additionally, the student learning system might include an ensemble of machine learning systems, such as shown the ensemble 200 in FIG. 1B. The learning coach 210 in such a scenario could control the data flow to the various machine learning systems and/or add members to the ensemble.

The student learning system(s) and machine learning coach preferably operate in parallel. That is, the machine learning coach observes the student learning system(s) while the student learning system(s) is/are in the learning process and the machine learning coach makes its changes to the student learning system(s) (e.g., hyperparameters, structural modifications, etc.) while the student learning system(s) is/are in the learning process. The learning coach and the student(s) may be the same or different types of machine learning architectures.

The learning coach 210 can have an objective function distinct from objective of the student learning system (e.g., the machine-learning system trained according to the methods of FIG. 1 or 1A). For example, the learning coach may make structural modifications to the student learning system to optimize some combination of the cost of errors and the cost of performing the computation. The learning coach can also make modifications to the student learning system, especially additions, to improve its capabilities while guaranteeing that there will be no degradation in performance.

More details about such learning coaches are explained in the following published international applications, which are incorporated herein in their entirety: WO 2018/063840 A1, published Apr. 5, 2018, entitled "LEARNING COACH FOR MACHINE LEARNING SYSTEM"; and WO 2018/175098 A1, published Sep. 27, 2018, entitled "LEARNING COACH FOR MACHINE LEARNING SYSTEM".

The learned parameters in a feed forward neural network may be trained by an iterative process called stochastic gradient descent, which is well-known to those skilled in the art of training neural networks. In stochastic gradient descent, the set of training data items is grouped into sets called "minibatches." In the iterative training procedure, each of the learned parameters is updated for each minibatch based on an estimate of the gradient of a specified objective function with respect to the learned parameters. For each minibatch, the gradient is estimated by accumulating for each data item in the minibatch an estimate of the gradient based on that data item. For an individual data item, the gradient is estimated by two computations: (1) a feed forward computation that estimates the activation value for each non-input layer node in the network, and (2) a computation of the partial derivatives of the objective with respect to each of the non-input layer nodes and each of the learned parameters. The computation of the partial derivatives proceeds backwards through the network and is called "back propagation." The feed forward computation of node activations and the back propagation computation are well-known to those skilled in the art of training neural networks.

Any directed graph for which there is no set of arcs connecting a node back to itself is called a "directed acyclic graph" (DAG). For any directed acyclic graph, it is always possible to number the nodes such that, for every directed arc in the graph, the source node of the directed arc has a lower number than the destination node. When more than one node has the same number, the set of nodes with a given associated number is called a "layer." For a directed acyclic graph, it is always possible to associate each node with a number representing its layer such that each directed arc goes from a source node in a lower numbered layer to a destination node in a higher numbered layer. Thus, each directed acyclic graph may be associated with a neural network, as described above. Generally, there may be more than one way to number a specified directed acyclic graph as a layered neural network. Any node in a directed acyclic graph which is not the destination node for any directed arc is an input node. Preferably, in a neural network, the input nodes are in a single layer, i.e., the input layer. Any node whose activation value is directly included in the objective or error cost function is an output node. Any node which is not a source node for any directed arc is an output node. In some embodiments, the output nodes may also be in a single layer, i.e., the output layer. However, in the invention disclosed herein, a node in an inner layer of a neural network may also be an output node.

Historically, in an artificial neural network, each node represented a simplified model of a neuron. In this simplified model, for a given state of the network, each node has an associated value, called its "activation" value, in analogy with the degree of activation of a specified neuron in a nervous system based on the activation of other neurons and the strengths of their synaptic connections to the specified neuron. The activation value of each node in the input layer is the value of the corresponding input variable.

Let each node in a neural network be associated with a number j. Let $$S(j)=\{i(j,1), i(j,2), i(j,3), \ldots, i(j,K)\}$$

be the set of nodes in the neural network for which there is a directed arc from node $i(j,k)$ to node j. The set $S(j)$ is called the "source set" for node j. Let $w(i,j)$ be the weight associated with the directed arc from node i node to j, where i is in $S(j)$. Generally, the activation value $A(j)$ for non-input layer node j for a given data item D is a function "g" of the activation values of the nodes in $S(j)$ and the weights of the connecting arcs, as indicated in the following equation:

$$A(j,D)=g(A(i(j,1),D),A(i(j,2),D), \ldots ,A(i(j,k),D), w(i(j,1),j),w(i(j,2),j), \ldots ,w(i(j,k),j)) \qquad (1)$$

Typically, the activation of a non-input layer node is a non-linear single-variable function of the weighted sum of the activations of the nodes in $S(j)$, with the term from node i weighted by the weight associated with the arc from node i to node j. That is, the activation of such a node takes the form $$A(j,D)=f(\Sigma_k w(i(j,k),j)A(i(j,k))+b(j)). \qquad (2)$$

where $b(j)$ is the bias term for node j.

Although most nodes have the form shown equation (2), some specialized nodes have an activation function with a different form. For example, the activation of a node may be the maximum of the activations of the activations of the set of source nodes connected to it by directed arcs with no weights associated with the directed arcs.

A neural network for which the associated directed graph is acyclic is called a "feed forward" network, an example of which is shown in FIG. 2. For an input data item D, it is possible to compute the activation value of each node in the network in a feed forward computation that starts with the input layer, whose activation values are set by the input data D, through the other layers of the network in numerical order. Because each source node in S(j) is in a lower-numbered layer, the function defined in the equation above may be evaluated for each node in turn.

A neural network for which the associated directed graph is not acyclic is called a "recurrent" network. The activation values for the nodes in a recurrent neural network R cannot be computed directly by simply using the feed forward computation in equation (2) above, because a node j may have a source node i that is in a higher layer or that is in the same layer as node j for which A(i, D) has not yet been evaluated. For example, node j itself has this property if there is an arc that goes from node j back to itself. A workaround for this problem is to unroll the recurrent network R into a set of connected feed forward networks, RF={Rf(1), Rf(2), ..., Rf(T))}. Each feed forward network Rf(t) is a modified copy of recurrent network R. The modification is that any directed arc in R from a node i to a node j for which i≥j is replaced by an arc from node i in feed forward network Rf(t) to node j in feedforward network Rf(t+1), or is simply deleted if t=T, since there is no Rf(T+1). The set of connected networks {Rf(t)} then forms a single feed forward network RF. The feed forward activation computation for the unrolled network RF is a finite approximation to the solution to the recursive equations defining the activation of the recurrent network R.

Figure 3:
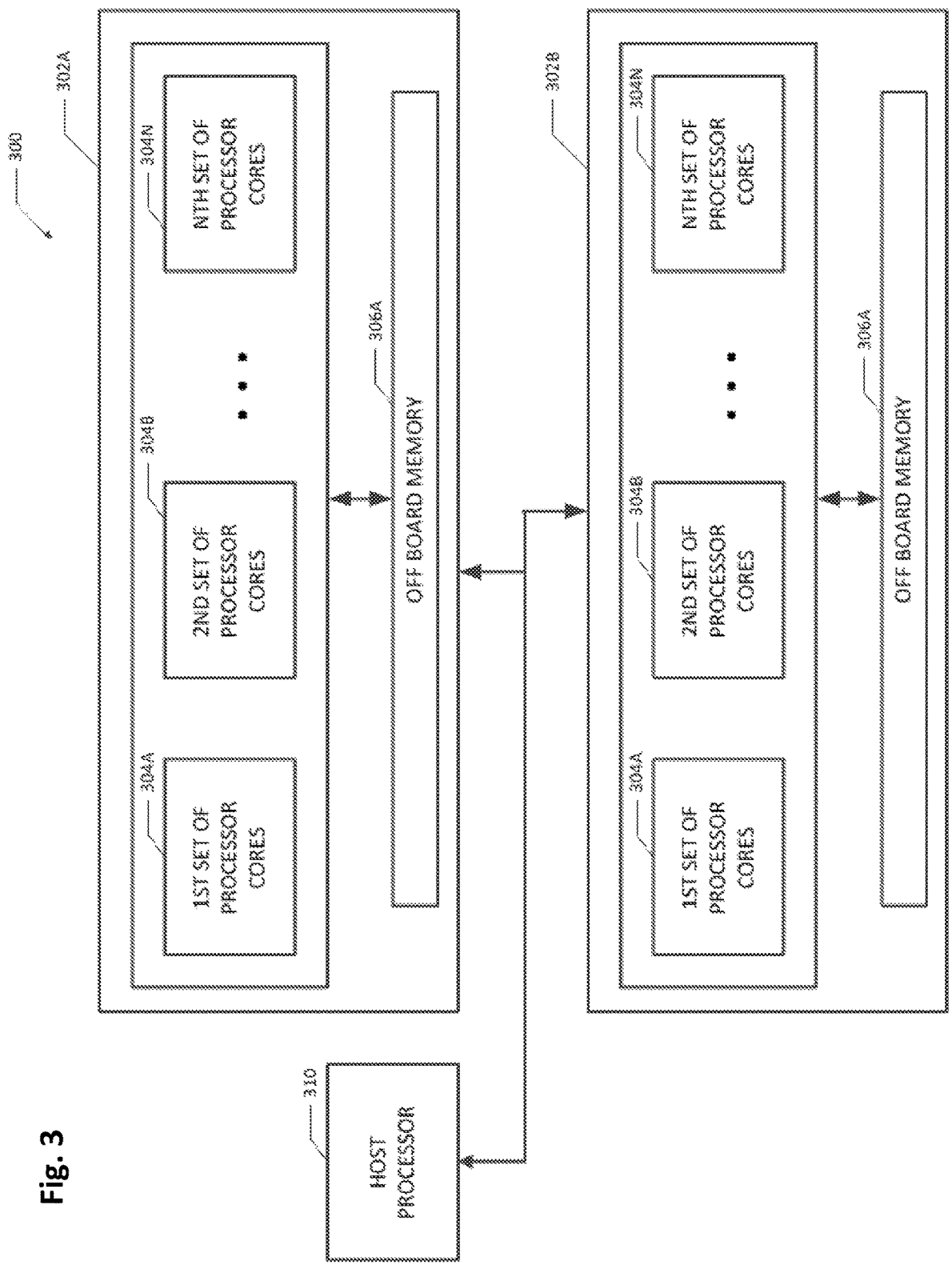
FIG. 3 is an illustrative diagram of a computer system that may be used to implement various aspects of the invention.

Any feed forward network, including an unrolled recurrent neural network may be trained using a computer system such as the system illustrated in FIG. 3.

In one embodiment, any feed forward neural network, including an unrolled recurrent neural network, may be trained by a well-known iterative parameter update process called stochastic gradient descent. In stochastic gradient descent, the training data items are organized into a set of minibatches and an update to the learned parameters is made based on an estimate of the negative of the gradient of the objective computed for each minibatch. The estimate of the gradient for a minibatch is computed by an estimate of the gradient of the objective for each data item in the minibatch and accumulating those estimates for all data items in the minibatch. This is the training method used to train the ensemble member network in step 106 of FIG. 1 and to jointly training the joint optimization network and the ensemble member networks in step 109 of FIG. 1.

In Step 101, the computer system (see FIG. 3) obtains a neural network, called the "base" network 201. The base network 201 may be pretrained, or it may be trained by stochastic gradient descent, as described above. As described below, the ensemble 200 is built by making a number of copies of the base network (see step 104) and then training them to be different from each other and to optimize a joint objective. For example, M copies $200_{1-M}$ of the base network 201 may be made, where $2 \leq M \leq 2^n$, where n is quantity of network elements of the base network 201 that are selected as described further below.

In Step 105, the computer system does a feed forward computation to compute the node activations for each non-input layer node of the base network 201 for each training data item in an initial set of training data items 212. The computer system then does a back propagation computation to compute the partial derivative of the objective with respect to each non-input layer node activation and with respect to each of the learned parameters.

In Step 102, the computer system selects n network elements of the base network 201. Each selected element can be, for example, a node or directed arc in the network. The criteria for selecting the n network elements may be determined by the system developer or by the learning coach 210. The process illustrated in FIG. 1 works with any selection criterion and different selection criteria can used in various embodiments of the invention depending on the needs of the embodiments. Some embodiments select only nodes and no arcs; other embodiments select both; and still other embodiments select only arcs. As an illustrative example of a specialized selection criterion, only input nodes may be selected as the network elements at step 102 where an ensemble is to be built that is robust against adversarial attacks. Put another way, in various, embodiments, s nodes are selected and t directed arcs are selected, where s+t=n, and where 0≤s≤n and 0≤t≤n.

The selection of n network elements enables an ensemble creation process, herein called "blasting" to distinguish it from other ensemble building methods such as bagging and boosting. In blasting, up to $2^n$ ensemble members $200_{1-M}$ (where $2 \leq M \leq 2^n$) are created at once and each is trained to change its learned parameters in a different direction, like the spread of the fragments when an explosive blast is used to break up a rock.

The value of n may be set by the system developer or may be determined by the learning coach 210 based on prior experience. The process of FIG. 1 works for n=1, but it is recommended that n>1.

In one embodiment, in Step 106, the computer system partitions the training data 212 into $2^n$ disjoint subsets $212_{1-2^{[<]BEGINITALmn}}$, so n should not be too large. Let D be the number of training data items, not counting data set aside for validation testing. In some embodiments, reasonable choices for the value of n are:

n=2, if D≤500;

n=2 or 3, if 500<D≤1000;

n=3, if 1000<D≤8000;

n≈log₂(D)−10, if D>8000.

In other embodiments, the $2^n$ subsets may be allowed to overlap such that there are $2^n$ subsets, but the subsets are not necessarily disjoint. In some embodiments, each of the $2^n$ subsets is unique (i.e., do not overlap completely) although not disjoint. In some embodiments, not all $2^n$ subsets are unique. However, in such an embodiment, M subsets may be selected, where $M < 2^n$, such that each of the M subsets is unique. In some embodiments, the M selected subsets are not necessarily unique.

The property that each ensemble member $200_{1-M}$ is trained on a disjoint subset $212_{1-2^{[<]BEGINITALmn}}$ allows a data item that is used for training one ensemble member to be used for development testing or cross validation of another ensemble member. Furthermore, having a large number of ensemble members and the availability of cross-validation data enables the computer system to train the ensemble to avoid or correct for the overfitting that would otherwise result from using a small training set for an ensemble member. Although to a lesser degree, development testing and cross-validation are also facilitated in a modified version of this embodiment in which the training set of each ensemble member is not disjoint but in which each training data item is only used in training a small fraction of the ensemble members. That is, there could be an upper limit (F)

on the number of subsets that each training data example can be placed into. For example, if F equals five, no training data examples could be put into more than five of the M subsets.

In some embodiments, it is desirable to generate a larger number of ensemble members each with a relatively small disjoint set of training data items. In such an embodiment, reasonable choices for the value of n are:

$n=2$, if $D \leq 255$;

$n \cong \log_2(D)-6$, if $D>255$.

In an illustrative embodiment, in step 103, the computer system begins a loop that goes from Step 103 through Step 107. Each loop creates a copy of the base network so the loop may be repeated M times to create the M copies of the base network $200_{1-M}$. In some embodiments, the loop is executed $2^n$ times to select all possible n-bit Boolean vectors. The number of different directions in which the learned parameters (e.g., directed arc weights and/or activation function biases) can be changed can correspond to the $2^n$ different vectors in the n-bit Boolean vectors. In some embodiments, the Boolean vector is selected at random without replacement for some number of vectors $m<2^n$.

The kth bit in the n-bit Boolean vector (where $1 \leq k \leq n$) indicates whether the sign of the derivative of the objective with respect to the kth network element selected in Step 102 should be positive or negative as part of the data selection process in Step 106.

The purpose of step 103 is to partition the initial set of training data 212 into the subsets $212_{1-2[<]BEGINITALmn}$ such that training an ensemble member $200_m$ on a specific subset will cause that ensemble member to be trained in a direction different from the direction of other ensemble members. For this purpose, step 103 is merely an illustrative example. Other embodiments may use other methods for creating this partition of the training data. Another illustrative example is discussed in association with FIG. 1A.

The number of training data items assigned to each ensemble member will vary from one ensemble member to another. For some ensemble members, the number of assigned training data items may be very small or may even be zero. In some embodiments, any ensemble member with less than a specified number of assigned training data items may be dropped from the set of ensemble members. In general, there is no requirement that there be an ensemble member for each of the possible n-bit Boolean vectors.

In some embodiments a training data item may be assigned to more than one ensemble member $200_{1-M}$. The data split in step 103 or in similar steps in other embodiments is used to indicate a preference that a training data item be assigned to an ensemble member associated with a bit vector agreeing with the bit vector for the data item. For example, for each training data item and for each ensemble member there can be an associated probability that the training data item be assigned to the training set for the ensemble member. Preferably, the probability of assignment is largest for the ensemble member specified in step 103. The assignments are not necessarily mutually exclusive, so the assignment probabilities for a training data item may sum to a number greater than 1.0. In these embodiments, the computer system keeps a record of the assignments for each training data item. This record is to be used for various purposes, such as in step 106.

In an illustrative embodiment, in Step 104, the computer system makes a copy $200_m$ of the base network (the m-th copy, where M). This m-th copy of the base network 201 specifies the architecture of a new ensemble member and the computer system copies the learned parameters of the base network 201 to initialize the values of the learned parameters for a new ensemble member.

In one embodiment, in Step 106, the computer system, for each training data item in the initial set 212 for each k, checks the agreement between the kth bit in the n-bit Boolean vector selected in Step 103 and the sign of the partial derivative of the kth network element selected in Step 102. For example, the n-bit Boolean vector may comprise a sequence of n values, where each value in the sequence assumes one of two values, such as 0 and 1. Agreement can be considered to exist between the kth bit of the n-bit Boolean vector and the sign of the partial derivative of the kth network element if (1) the kth bit of the n-bit Boolean vector is 0 and the sign of the partial derivative of the kth network element is negative, or (2) the kth bit of the n-bit Boolean vector is 1 and the sign of the partial derivative of the kth network element is positive. If the kth network element is a node, the kth bit in the Boolean vector is compared with the sign of the partial derivative with respect to the activation value of the node. If the kth network element is an arc, the kth bit in the Boolean vector is compared with the sign of the partial derivative of the objective with respect to the weight parameter associated with the arc. If there is agreement for all n bits of the Boolean vector, then the training data item is selected for training the m-th copy of the base network created in Step 104. This process can be repeated for each training data item in the initial set 212 to generate the subset of training data for training the m-th copy. Moreover, as described above, the loop from steps 103 to 107 can be repeated M times, where $2 \leq M \leq 2^n$, to create the M copies of the base network 201, each being trained with a set of training data as described herein.

As mentioned above, in some embodiments, a training data item may be assigned to more than one ensemble member. In such an embodiment, in Step 106, for each training data item, the computer system checks the record created in step 103 to check whether the training data item is assigned to the ensemble member for the current pass through the loop from step 103 to step 107.

In Step 107, the computer system trains the m-th network copy made in Step 104 on the training data selected in Step 106. Once trained, this m-th network copy becomes a member of the ensemble 200 being created.

After Step 107 is completed, the computer system returns to Step 103 until a stopping criterion is met. For example, the stopping criterion may be that all possible n-bit vectors have been selected in Step 103 or that a specified number of n-bit vectors has been selected. When the stopping criterion of Step 107 has been met, the computer system proceeds to step 108. In step 108, the computer system adds a mechanism for computing a single resulting output based on the output values of the ensemble members $200_{1-M}$. There are several well-known methods for combining the results of ensemble members. For example, the combined result may be the arithmetic mean of the results of the individual ensemble members $200_{1-M}$. As another example, the combined result may be the geometric mean of the results of the individual ensemble members. Another example, in the case of a classification problem, is that the classification of each ensemble member be treated as a vote for its best scoring output classification. In this example, the classification for the combined ensemble 200 is the category with the most votes even if it is not a majority.

In some embodiments the process of creating and training the ensemble 200 is complete after step 108. In some embodiments, the computer system proceeds to Step 109 for joint optimization of the ensemble. In Step 109, the computer system integrates all the ensemble members $200_{1-M}$ into a single network by adding a joint optimization network 220 and performs training with joint optimization. In joint optimization training, a neural network that replaces and generalizes the combining rule for the ensemble is created. This joint optimization network 200 is trained by stochastic gradient descent based on estimated gradients computed by back propagation of partial derivatives of the joint objective. The joint optimization network receives as input the concatenation of the output vectors of all the ensemble members $200_{1-M}$. The back propagation of partial derivatives of the joint objective proceeds backwards from the input to the joint optimization network 220 to the output layer of each of the ensemble members $200_{1-M}$ and then backwards through each ensemble member network $200_{1-M}$. A description of a joint optimization network and training with joint optimization is given in international patent application WO 2019/067542 A1, published Apr. 4, 2019, entitled "Joint Optimization of Ensembles in Deep Learning," which is incorporated herein in its entirety.

FIG. 1A a flow chart of another illustrative embodiment. The process illustrated in FIG. 1A is similar to the process illustrated in FIG. 1, except step 102A uses a different method for partitioning the training data from the method used in step 102 of FIG. 1. Steps 103A, 106A, 107A, and 109A are modified in accordance with the change in step 102A. The other steps of the process, 101A, 105A, 104A, and 108A are essentially unchanged, except they may be generalized to apply to a machine learning system other than a neural network.

In step 101A, the computer system obtains a machine learning system (e.g., the base network 201) in which it is possible to compute the derivative of the objective with respect to the learned parameters; for example, the machine learning system obtained in step 101A may be a neural network as in step 101 of FIG. 1. In the case in which the obtained machine learning system is a neural network, step 101A is similar to step 101 in FIG. 1 and step 105A is similar to step 105 in FIG. 1. However, even when the machine learning system obtained in step 101A is a neural network, step 102A is different from step 102 in FIG. 1 in that Step 102A does not require the machine learning system obtained in step 101A to be a neural network nor does step 102A require the machine learning system obtained in step 101A to be trained by stochastic gradient descent based on back propagation.

In step 105A, the computer system computes the partial derivative of the objective of the machine learning system obtained in step 101A with respect to each learned parameter for each data item. In step 105A, the computer system also optionally computes the partial derivative of the objective of the machine learning system obtained in step 101A with respect to other elements of the machine learning system obtained in step 101A, such as with respect to the node activations in a neural network.

In step 102A, the computer system trains a machine learning classifier 222 to classify the training data items in the initial set into various classification categories (e.g., $2^n$ different categories). The input variables to the classifier 222 are the values of the partial derivatives computed by the computer system for each training data item in step 105A. In step 102A, the computer system may train the classifier 222 using supervised, unsupervised, or semi-supervised learning in various embodiments.

In various embodiments, the classifier 222 in step 102A may be any form of classifier, for example it may be a decision tree, a neural network, or a clustering algorithm. In various embodiments, the classifier 222 in step 102A may be trained with supervised learning or with unsupervised learning, using any of many training algorithms that are well-known to those skilled in the art of training machine learning systems, with the training algorithms depending on the type of classifier.

In one illustrative embodiment, output targets for supervised learning are the n-bit Boolean vectors used in step 102 of FIG. 1. In this embodiment, the number n of network elements may be greater than the number n of network elements that would normally be used in step 102 in an implementation of FIG. 1. In this embodiment, there is be no limit on the number n of network elements.

In some embodiments, the training of the classifier 222 in step 102A may be based in part on a measure of distance between pairs of data items, such that, for example, data items that are close in distance according to the selected measure may be classified to a common classification category. In some embodiments, such as for unsupervised learning in general or for unsupervised or partially supervised clustering algorithms, a distance measure may be used that weights a change in the sign of a partial derivative more heavily than a change of the same magnitude that does not cause a change in the sign of the partial derivative. For example, let D1(j) represent the partial derivative on an objective with respect to element j of a machine learning system evaluated for a first training data item d1, and let D2(j) represent the partial derivative of the objective with respect to the same element j evaluated for a second training data item d2. An example formula for the distance between training data item d1 and training data item d2 may be defined by $$D(d1,d2)=\Sigma_j \alpha * \min(|D1(j)-D2(j)|,\beta)+(1-\alpha)(\text{sign}(D1(j))-\text{sign}(D2(j))), \quad (3)$$

where $\alpha$ is a hyperparameter that controls the relative weight given to the absolute difference compared to the weight given to the difference in the signs of the signs of the partial derivatives, and $\beta$ is a hyperparameter that limits the maximum contribution to the distance measure from the absolute difference. Other distance measures may be used. Some embodiments give substantial relative weight to the signs of the derivatives, e.g. by using a limit like $\beta$ in the example. Another example formula for the distance is defined by $$D(d1,d2)=\Sigma_j |D1(j)-D2(j)|*|\text{sign}(D1(j)-\text{sign}(D2(j))|. \quad (4)$$

In step 103A, the computer system begins a loop that cycles through each output category for the classifier of step 102A, or for each cluster if step 102A uses a clustering algorithm. In step 104A, the computer system creates a copy $200_{1-M}$ of the base machine learning system 201 obtained in step 101A. This copy of the base machine learning system 201 is a new ensemble member. In step 106A, the computer system sets the training set of the new ensemble member $200_m$ created in step 104A to be the set of training data items classified by the classifier of step 102A to be in the category or cluster specified in step 103A. In step 107A, the computer system trains the ensemble member $200_m$ created in step 104A by supervised learning based on the training data selected in step 106A.

When step 107A is completed for an ensemble member, the computer system goes back to step 103A until a stopping criterion is met. For example, a stopping criterion may be that all the classification categories that have been assigned more than a specified minimum number of data items have been processed through the loop from step 103A to 107A.

If a stopping criterion has been met, the computer system proceeds to step 108A. In step 108A the computer system adds a mechanism for computing a single resulting output based on the output values of the ensemble members $200_{1-M}$. Step 108A is the same as step 108 in FIG. 1. In some embodiments the process of creating and training of the ensemble 200 is then complete. In some embodiments, the computer system proceeds to Step 109A.

In Step 109A, the computer system integrates all the ensemble members into a single network by adding the combining network 220. The combining network 220 is initialized to emulate the combing rule used in step 108A. The combining network 220 is then trained to optimize the shared objective. If the ensemble members can be trained by back propagation, e.g. if the ensemble members $200_{1-M}$ are neural networks, then the back propagation computed in training the combining network is back propagated to the output of each ensemble member so that the ensemble members are jointly optimized, as in step 109 of FIG. 1.

FIG. 3 is a diagram of a computer system 300 that could be used to implement the embodiments described above, such as the process described in FIG. 1. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A-B. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently than a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different ensemble members and/or components. For example, in one embodiment, the cores of the first processor unit 302A may implement the ensemble and the second processor unit 302B may implement the learning coach. For example, the cores of the first processor unit 302A may train the neural networks of the ensemble and perform the process described in connection with FIG. 1 or 1A, whereas the cores of the second processor unit 302B may learn, from implementation of the learning coach, the parameters for the ensemble members. Further, different sets of cores in the first processor unit 302A may be responsible for different ensemble members. For example, one set of cores may be responsible (e.g., train) the base network; a second set of cores may be responsible for the first copy thereof; and so on. One or more host processors 310 may coordinate and control the processor units 302A-B. In another embodiment, there may be a processing unit 302 for each ensemble member, and optionally an additional one or more processor units for each learning coach.

In other embodiments, the process illustrated by FIG. 1 could be implemented with one processor unit 302. In embodiments where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

In one general aspect, therefore, the present invention is directed to computer-implemented systems and methods for building ensembles $200_{1-M}$ for deep learning through parallel data splitting. In various implementations, the systems and methods create and train an ensemble of up to $2^n$ ensemble members $200_{1-M}$ based on a single base network 201 and a selection of n network elements of the base network 201. The ensemble members $200_{1-M}$ are created by the "blasting" process, in which training data are selected for each of the up to $2^n$ ensemble members $200_{1-M}$ such that each of the ensemble members $200_{1-M}$ trains with updates in a different direction from each of the other ensemble members. The ensemble members $200_{1-M}$ may also be trained with joint optimization.

In one general aspect, therefor, the present invention is directed to computer-implemented systems and methods for building a machine learning ensemble. The method may comprise the step of making, by a computer system that comprises one or more programmed processing units, M copies of a base machine-learning network, where $2<M<2^n$, where n is a number of selected network elements (the "n selected network elements") of the base machine-learning network and n>1. The method may also comprise the step of training, by the computer system, each of the M copies of the base machine-learning network such that each of the M copies of the base machine-learning network is trained to change its learned parameters in a different direction than any of the other M copies. Finally, the method may comprise the step of combining, by the computer system, the M copies of the base machine-learning network into an ensemble. The one or more processing units of the computer system are programmed to carry out these steps.

In various implementations, the base machine-learning network comprises a base neural network that comprises a plurality of nodes and plurality of directed arcs, where each directed arc is between two nodes of the base neural network, in which case the n selected network elements can comprise s nodes of the base neural network and t directed arcs of the base neural network, where s and t are integers greater than or equal to zero, and where s+t=n. Further, the base neural network may comprise a deep neural network, such as a deep feed forward network.

In various implementations, the method comprises, prior to making the M copies of a base machine-learning network, training, by the computer system, the base machine-learning network. This training may be through stochastic gradient descent. Also, the n selected network elements of the base machine-learning network may be selected by a machine-learning learning coach. In addition, the method may further comprise the step of, after combining the base machine-learning network and the M copies of the base machine-learning network into the ensemble, training, by the computer system, the ensemble with a joint optimization.

In various implementations, training each of the M copies of the base machine-learning network may comprise partitioning an initial set of training data for the M copies into M subsets of training data and training each of the M copies on a separate subset of training data. In various embodiments, the M subsets of training data comprise M unique subsets of training data. Also, the M unique subsets of training data may comprise M disjoint sets of training data. Also, in various embodiments, there is an upper limit F on the number of M subsets on which every training data example in the initial set of training data can be included, such that no training data examples in the initial training set may be placed into more than F of the M subsets.

In various implementations, the step of training each of the M copies of the base machine-learning network comprises training, by the computer system, the m-th copy of the base neural network, where m=1, . . . , M, with a m-th set of training data items, where the m-th set of training data items comprises each training data item in an initial set of training data items where there is agreement between a value of a k-th bit of an n-bit Boolean vector and a sign for the kth selected network element of the n selected network elements of the base neural network for the training data item, for all k=1, . . . , n. In one embodiment, if the k-th selected network element is a node, the value of the k-th bit of the n-bit Boolean vector is compared to the sign of the partial derivative for an objective of the base neural network with respect to an activation value for the node to determine agreement, and if the k-th selected network element is a directed arc, the value of the k-th bit of the n-bit Boolean vector is compared to the sign of the partial derivative with respect to a weight parameter for the directed arc to determine agreement.

In addition, the method can further comprise the step of, prior to making the M copies of the base machine-learning network, iteratively for each training data item in an initial set of training data items: (1) computing, by the computer system, in a forward computation through the base network, an activation value for each non-input layer node of the base network; and (2) computing, by the computer system, in a back-propagation computation through the base network: (a) for each non-input layer node, a partial derivative for an objective of the base network with respect to the activation value for the node; and (b) for each directed arc in the base network, a partial derivative for the objective with respect to a weight parameter for the directed arc.

Also, the step of training each of the M copies of the base machine-learning network can comprise the steps of: training, by the computer system, a machine-learning classifier, to classify each training data item into at least one of two or more classification categories, where training the machine-learning classifier comprises using partial derivatives computed in the back-propagation computation through the base network as input variables; partitioning, by the computer system, the training data items into subsets of training data items based on the classification categories; and training, by the computer system, each of the M copies of the base machine-learning network with one of the subsets of training data items.

The two or more classification categories may comprise $2^n$ classification categories, such that each training data item is classified to one of the $2^n$ classification categories and each of the $2^n$ classification categories corresponds to a separate n-bit Boolean vector. In that case, the step of training each of the M copies of the base machine-learning network may comprise training, by the computer system, the m-th copy of the base network, where m=1, . . . , M, with the training data items in the m-th classification category, where the training data items in the m-th classification category have agreement between a value of a k-th bit of the n-bit Boolean vector for the classification category and a sign for the kth selected network element of the n selected network elements of the base network for the training data item, for all k=1, . . . , n.

In various implementations, the machine-learning classifier is trained to classify data items to the two or more classification categories based on a distance measure between pairs of training data items. Additionally, the distance measure may weight a change in a sign of a partial derivative more heavily than a change of a same magnitude in the partial derivative that does not cause a change in the sign of the partial derivative. Also, the machine-learning classifier may comprise a decision tree, a neural network or a clustering algorithm. Still further, the machine-learning classifier may be trained through supervised learning.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for building a machine learning ensemble, the method comprising:

selecting, by a computer system, n selected network elements of a base machine-learning network, where n>1;

making, by the computer system, M copies of the base machine-learning network, wherein the value, of M is greater than or equal to 2, and less than or equal to $2^n$;

wherein prior to making the M copies of the base machine-learning network, iteratively for each training data item in an initial. set of training data items:

computing, by a computer system, in a forward computation through the base machine- learning network, an activation value for each non-input layer node of the base machine-learning network; and computing, by the computer system, in a back-propagation computation through the base machine-learning network:

for each non-input layer node, a partial derivative for an objective of the base machine-learning, network with respect to the activation value for the non- input layer node; and for each directed arc in the base machine-learning network, a partial derivative for the objective with respect to a weight parameter for the directed arc:

training, by the computer system, each of the M copies of the base machine-learning network such that each of the M copies of the base machine-learning network is trained to change its learned parameters in a different direction than any of the other M copies, wherein training each of the_M copies of the base machine-learning network comprises training, by the computer system, the m-th copy of the base network, where m=1, ..., M, with a m-th set of training data items, wherein the m-th set of training data items comprises each training data item in an initial set of training data. items where there is agreement between a value of a k-th bit of an n-bit Boolean vector and a sign for the kth selected network element of the n selected network elements of the base network for the training data item, for all k=1, ..., n, where:
- if the k-th selected network element is a node, the value of the k-th bit of the n-bit Boolean vector is compared to the sign of the partial derivative for the objective of the base network with respect to the activation value for the node to determine agreement; and
- if the k-th selected network clement is a directed arc, the value of the k-th bit of the n-hit Boolean vector is compared to the sign of the partial derivative with respect to the weight parameter for the directed arc to determine agreement; and combining, by the computer system, the M copies of the base machine-learning network into an ensemble.

2. The method of claim wherein the base machine-learning network comprises a base neural network.

3. The method of claim 2, wherein: the base neural network comprises a plurality of nodes and plurality of directed arcs; each directed arc is between two nodes of the base neural network; and the n selected network elements of the base machine-learning network comprise s nodes of the base neural network and t directed arcs of the base neural network, where s and t are integers greater than or equal to zero, and where s+t=n.

4. The method of claim 2, wherein the base neural network comprises a base deep neural network.

5. The method of claim 4. wherein the base deep neural network comprises a base feed forward deep neural network.

6. The method of claim 1, wherein the selected network elements of the base machine- learning network are selected by a machine-learning learning coach.

7. The method of claim 1, further comprising, after combining the base machine-learning network and the M copies of the base machine-learning network into the ensemble, training, by the computer system, the ensemble with a joint optimization network.

8. The method of claim 1, wherein training each of the M copies of the base machine-learning network comprises: partitioning a initial set of training data for the M copies into M subsets of training data; and training each of the M copies on a separate subset of training data.

9. The method of claim 8, Where the M subsets of training data comprise M unique subsets of training data.

10. The method of claim 9, wherein the M unique subsets of training data comprise M disjoint sets of training data.

11. The method of claim 8, wherein there is an upper limit F on the number of M subsets of training data on which every training data example in the initial set of training data can be included, such that no training data examples in the initial training set may be placed into more than F of the M subsets.

12. The method of claim wherein training each of the M copies of the base machine-learning network comprises: training, by the computer system, a machine-learning classifier, to classify each training data item into at least one of two or more classification categories, wherein training the machine- learning classifier comprises using partial derivatives computed in the back-propagation computation through the base network as input variables; partitioning, by the computer system, the training, data items into subsets of training data items based on the classification categories; and training, by the computer system, each of the M copies of the base machine-learning network with one of the subsets of training data items.

13. The method of claim 12, wherein the machine-learning classifier is trained to classify data items to the two or more classification categories based on a distance measure between pairs of training data items.

14. The method of claim 13, wherein the distance measure is computed using a formula that comprises a hyperparameter, wherein the hyperparameter is a relative weight given to the distance measure compared to a weight given to a difference in signs of partial derivatives for the pairs of training data items.

15. The method of claim 12, wherein the machine-learning classifier comprises a classifier form selected from the group consisting of a decision tree, a neural network and a clustering algorithm.

16. The method of claim 12, wherein training the machine-learning classifier is trained through supervised learning.

17. A computer system for building a machine learning ensemble, the computer system comprising one or more processing units that are programmed to: select n selected network elements of a base machine-learning network, where n>1;
- make M copies of the base machine-learning network, wherein the value_of M is greater than or equal to 2, and less than or equal to $2^n$;
- wherein prior to making the M copies of the base machine-learning network, iteratively for each training data item in an initial set of training data items:
  - compute, in a forward computation through the base machine-learning network,
    - an activation value for each non-input layer node of the base machine-learning network; and
  - compute in a hack-propagation computation through the base machine-learning network:
    - for each non-input layer node, a partial derivative for an objective of the base machine-learning network with respect to the activation value for the node: and
    - for each directed arc in the base machine-learning network, a partial derivative for the objective with respect to a weight parameter for the directed arc;
- train each of the M copies of the base machine-learning network such that each of the M copies of the base machine-learning network is trained to change its learned parameters in a different direction than any of the other M copies, wherein the one or more processing units are programmed to train each of the M copies of the base machine-learning, network by training the m-th copy of the base network, where m=1, ..., M, with a m-th set of training data items, wherein the m-th set of training data items comprises each training data item in an initial set of training data. items where there is agreement between a value of a k-th bit of an n_bit Boolean vector and a sign for the kth selected network element of the n selected network elements of the base network for the training data item, for all k=1, ..., n, where:
  - if the k-th selected network element is a node, the value of the k-th bit of the n-bit Boolean vector is compared to the sign of the partial derivative for the objective of the base network with respect to the activation value for the node to determine agreement, and if the k-th selected network element is a directed arc, the value of the k-th bit of the n-bit Boolean vector is compared to the sign of the partial derivative with respect to the weight parameter for the directed arc to determine agreement; and combine the M copies of the base machine-learning network into an ensemble.

18. The computer system of claim 17, wherein the base machine-learning network comprises a base neural network.

19. The computer system of claim 18, wherein: the base neural network comprises a plurality of nodes and plurality of directed arcs; each directed arc is between two nodes of the base neural network; and the n selected network elements of the base machine-learning network comprise s nodes of the base neural network and t directed arcs of the base neural network, where s and t are integers greater than or equal to zero, and where s+7=n.

20. The computer system of claim 18, wherein the base neural network comprises a base deep neural network.

21. The computer system of claim 20, wherein the base deep neural network comprises a base feed forward deep neural network.

22. The computer system of claim 17, wherein the computer system comprises a machine learning coach that selects the n selected network elements of the base machine-learning network.

23. The computer system of claim 17, wherein the one or more processing units are further programmed to, after combining the base machine-learning network and the M copies of the base machine-learning network into the ensemble, train the ensemble with a joint optimization network.

24. The computer system of claim 17, wherein the one or more processing units are further programmed to train each of the M copies of the base may network by:

partitioning a initial set of training data for the M copies into M subsets of training data; and training each of the M copies on a separate subset of training data.

25. The computer system of claim 24, where the M subsets of training data comprise M unique subsets of training data.

26. The computer system of claim 25, wherein the M unique subsets of training data comprise M disjoint sets of training data.

27. The computer system of claim 24, wherein there is an upper limit F On the number of subsets of training data on which every training data example in the initial set of training data can be included, such that no training data examples in the initial training set may be placed into more than F of the M subsets.

28. The computer system of claim 17, wherein the one or more processing units are further programmed to train each of the M copies of the base machine- learning network by:

training a machine-learning classifier, to classify each training data item into at least one of two or more classification categories, wherein training the machine-teaming classifier comprises using partial derivatives computed in the back-propagation computation through the base network as input variables; partitioning the training data items into subsets of training data items based on the classification categories; and training each of the NI copies of the base machine-learning network with one of the subsets of training data items.

29. The computer system of claim 28, wherein the machine-learning classifier is trained to classify data items to the two or more classification categories based on a distance measure between pairs of training data items.

30. The computer system of claim 29, wherein the distance measure is computed using a formula that comprises a hyperparameter, wherein the hvperparameter is a relative weight given to the distance measure compared to a weight given to a difference in signs of partial derivatives for the pairs of training data items.

31. The computer system of claim 28, wherein the machine-learning classifier comprises a classifier form selected from the group consisting of a decision tree, a neural network and a clustering algorithm.

32. The computer system of claim 28, wherein the machine-learning classifier is trained through supervised learning.

* * * * *